E. RYDER.
CUT-OUT VALVE.
APPLICATION FILED NOV. 15, 1920.
1,398,976.
Patented Dec. 6, 1921.
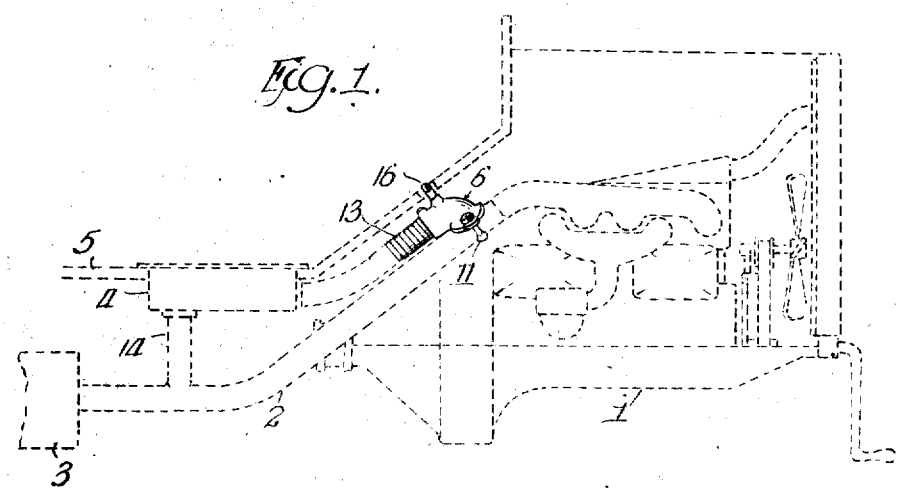
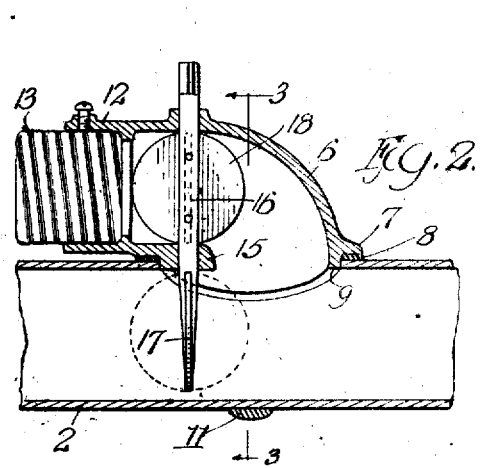
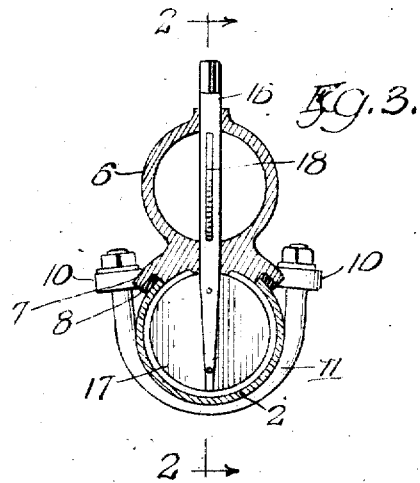
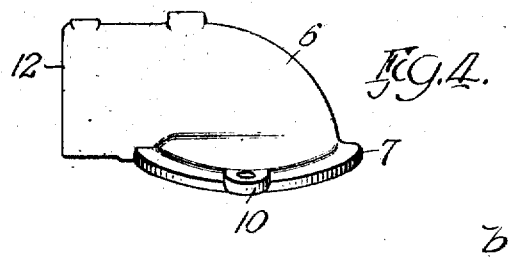
Inventor
Elmer Ryder
by Eugene Cowan
Atty.

UNITED STATES PATENT OFFICE.

ELMER RYDER, OF ARGO, ILLINOIS.

CUT-OUT VALVE.

1,398,976.  Specification of Letters Patent.  Patented Dec. 6, 1921.

Application filed November 15, 1920. Serial No. 424,068.

*To all whom it may concern:*

Be it known that I, ELMER RYDER, a citizen of the United States, residing at Argo, in the county of Cook and State of Illinois, have invented new and useful Improvements in Cut-Out Valves, of which the following is a specification.

This invention relates to cut-out valves for exhaust pipes of automobile and like engines.

Among the objects of my invention is to provide two disk shaped valve members, one in the exhaust pipe between the engine and the muffler and the other in a branch pipe, and to mount said valves on a single valve stem to simplify the construction and require only one operating part. A further object of my invention is to mount the stem in a fitting so constructed that it may be applied to the exhaust pipe without cutting that pipe in two.

The invention consists further in the matters hereinafter described and more particularly pointed out in the appended claims.

In the accompanying drawings—

Figure 1 shows a valve device of my invention applied to the exhaust pipe of an automobile engine between the same and the muffler and connected with a heater in the floor of the car;

Fig. 2 is a longitudinal sectional view taken on line 2—2 of Fig. 3;

Fig. 3 is a transverse sectional view taken on line 3—3 of Fig. 2; and

Fig. 4 is a perspective view of a detail of construction to be hereinafter described.

In Fig. 1, 1 indicates an automobile engine, 2 the exhaust pipe leading therefrom, 3 the muffler, and 4 the heater or foot warmer in the floor 5 of the car.

The valve device of my invention comprises a pipe section 6 shaped like an elbow fitting and having at one end a base flange 7 shaped to seat against the outside of the exhaust pipe 2 with a packing ring 8 between the parts, as shown. Before the pipe section 6 is applied, a hole is cut in the surrounding wall of the exhaust pipe 2, and the pipe section 6 has a rib 9 to enter and fit in the same, as shown in Fig. 2. The base flange 7 has bolt lugs 10 on opposite sides to receive the threaded ends of a U-bolt 11 applied under the exhaust pipe 2, the bolt 11 clamping the section 6 on the pipe 2 and by the packing ring forming a leak proof joint.

The section 6 has a pipe extension 12 to which a pipe 13 is coupled, this pipe 13 in the drawing being of the flexible type and leads to the heater 4, which has an outlet pipe 14 discharging into the exhaust pipe 2 in advance of the muffler 3.

The section 6 has an integral portion 15 in line with the bottom of the extension 12 and projecting part way into the passage through the section. Through this lug 15 extends a valve stem 16. By reason of said lug 15, the stem 16 may extend down into the exhaust pipe 2 and across the same, and has a valve member 17 secured thereto. The stem 16 extends across the fitting 6 and has secured thereto a valve member 18. These valve members 17, 18 are in the form of flat circular disks, and are arranged on the single valve stem 16 at right-angles to each other, so that when the stem 16 is turned to close the valve 17 in the exhaust pipe 2, the valve disk 18 in the fitting is turned into open position, thus allowing the exhaust gases to pass into and through the heater 4 when the heater is connected with the fitting 6. When the fitting 6 is used as a cut-out or testing valve, the fitting is not connected with the heater, but opens direct to the atmosphere; and when the valve stem is turned to close the valve member 17, the muffler is cut out. The stem 16 projects out beyond the fitting so that it may be engaged with any suitable means that may be employed for turning it. By turning the stem 16 part way around, both valve members 17, 18 may be moved into partial open positions, the extent of which may be varied between fully open and fully closed positions.

The two valve members 17, 18 being on one stem 16, simplifies the construction, and makes positive the action of the valves, as only one stem need be turned to shut off one pipe and open another. Moreover, the valve members being on one stem, permits the mounting of the valves and stem in a fitting 6 made so that it may be applied to an exhaust pipe without being required to cut that pipe in two and insert the fitting between them.

I claim as my invention:

1. The combination with an exhaust pipe having a hole made in its wall without cutting the pipe in two, of an elbow shaped casing applied against said pipe about said hole and having but one passage extending therethrough and opening into said exhaust pipe through said hole, said casing having a portion projecting into said passage adjacent said hole, a single valve stem extending across said passage and journaled in said projection and the outer wall of said casing and terminating short of the wall of the exhaust pipe, and two disk shaped valve members on said stem, one in the exhaust pipe and the other in the passage in said casing and arranged at such an angle to each other that when the stem is turned to move one disk open the other will be moved closed.

2. The combination with an exhaust pipe having a hole made in its wall without cutting the pipe in two, of an elbow shaped casing applied against said pipe and having a rib to fit in said hole and an exterior flange to seat against said pipe at said hole, a clamp bolt applied about said exhaust pipe and engaged with said flange to clamp the casing on said pipe, said casing having but a single passage extending therethrough and opening into said exhaust pipe through said hole, said casing having a portion projecting into said passage adjacent said hole, a single valve stem extending across said passage and journaled in said projection and the outer wall of said casing and terminating short of the wall of the exhaust pipe, and two disk shaped valve members on said stem, one in the exhaust pipe and the other in the passage in said casing and arranged at such an angle to each other that when the stem is turned to move one disk open the other will be moved closed.

In testimony that I claim the foregoing as my invention, I affix my signature, this 12th day of November, A. D. 1920.

ELMER RYDER.